United States Patent [19]
Arnold et al.

[11] Patent Number: 5,177,769
[45] Date of Patent: Jan. 5, 1993

[54] DIGITAL CIRCUITS FOR GENERATING SIGNAL SEQUENCES FOR LINEAR TDMA SYSTEMS

[75] Inventors: Hamilton W. Arnold, Middletown; Nelson R. Sollenberger, Tinton Falls, both of N.J.

[73] Assignee: Bell Communications Research, Inc., Livingston, N.J.

[21] Appl. No.: 695,416

[22] Filed: May 3, 1991

[51] Int. Cl.$^5$ .................................. H04L 25/03
[52] U.S. Cl. ............................ 375/60; 332/103
[58] Field of Search ................. 375/60, 67, 59; 332/103, 123, 124, 160, 176

[56] References Cited

U.S. PATENT DOCUMENTS

| | | | |
|---|---|---|---|
| 4,750,192 | 6/1988 | Dzung | 375/60 |
| 4,757,519 | 7/1988 | Collison et al. | 375/67 |
| 4,849,991 | 7/1989 | Arnold et al. | 375/84 |
| 4,937,841 | 6/1990 | Chuang et al. | 375/94 |
| 4,941,155 | 7/1990 | Chuang et al. | 375/84 |
| 5,093,637 | 3/1992 | Isota et al. | 332/103 |
| 5,105,445 | 4/1992 | Karam et al. | 375/60 |

*Primary Examiner*—Stephen Chin
*Attorney, Agent, or Firm*—Leonard Charles Suchyta

[57] ABSTRACT

Digital circuitry comprising multiple read-only-memory (ROM) units that store predetermined data sequences are utilized to generate a digital representation of a composite signal that represents overlapping Nyquist pulses derived from input data bits. The generated signal exhibits relatively fast ON/OFF transitions. At the same time, control signals applied to the outputs of the ROMs insure that the representation preserves prespecified tail portions that minimize spectral spreading in a time-division multiple-access (TDMA) system. Once version of the circuitry generates a digital representation of a baseband signal derived from a single stream of input data bits. Another version of the circuitry generates a digital representation of a quadrature-phase-modulated carrier derived from two independent input data streams.

15 Claims, 5 Drawing Sheets

DIGITAL CIRCUITS FOR GENERATING SIGNAL SEQUENCES FOR LINEAR TDMA SYSTEMS

BACKGROUND OF THE INVENTION

This invention relates to signal processing and, more particularly, to digital circuitry for converting digital data to signal sequences suitable for linear time-division-multiple-access (TDMA) systems.

In a typical TDMA radio system, multiple users are respectively assigned time slots in a specified channel. During each time slot, the assigned user generates a burst of signals for transmission. To minimize the extent of so-called guard time between adjacent slots, it is desirable to control each burst to turn ON and OFF in a relatively rapid manner. At the same time, the ON/OFF control of each burst in a channel must be done in a manner that does not result in spectral spreading that can interfere with other channels that are nearby in frequency.

In theory, signaling pulses such as square-root Nyquist pulses or Nyquist pulses are well suited for representing signals in a TDMA burst. By means of such a representation of overlapping pulses, a burst characterized by zero interpulse interference within the burst can be realized. By preserving the Nyquist pulse shape at the beginning and end of each burst, transition times between adjacent bursts can be minimized while causing no additional spectral spreading.

Various approaches have heretofore been suggested for generating bursts that consist of overlapping Nyquist pulses. Some of these approaches require the use of relatively complicated and expensive filters. Other approaches have attempted to utilize digital circuitry to generate the requisite pulses. But these latter approaches have not resulted in relatively simple implementations that represent the beginning and end portions of each burst in a manner that addresses the spectral spreading problem.

Accordingly, efforts have continued by workers skilled in the art directed at trying to devise relatively simple and inexpensive ways of accurately generating bursts that consist of overlapping Nyquist pulses without distortion in the ON/OFF periods. It was recognized that these efforts if successful would contribute importantly to the design of improved TDMA systems.

Various aspects of TDMA have been treated in prior art patents such as U.S. Pat. No. 4,849,991, entitled "Method and Circuitry for Determining Symbol Timing for Time Division Multiple Access Radio Systems," issued Jul. 18, 1989 to the inventors herein; U.S. Pat. No. 4,937,841, entitled "Method and Circuitry for Carrier Recovery for Time Division Multiple Access Radio Systems," issued Jun. 16, 1990 to J. C. Chuang and N. R. Sollenberger, the latter an inventor herein; and U.S. Pat. No. 4,941,155, entitled "Method and Circuitry for Symbol Timing and Frequency Offset Estimation in Time Division Multiple Access Radio Systems," issued Jul. 10, 1990, also to J. C. Chuang and N. R. Sollenberger. A technique for jointly performing burst synchronization and error detection in a TDM/TDMA system is described in co-pending commonly assigned patent application Ser. No. 404,946, filed Sep. 9, 1989. Also, a technique for assigning up-link frequencies to the portables in a TDM/TDMA system is described in co-pending commonly assigned patent application Ser. No. 619,059, filed Nov. 28, 1990.

SUMMARY OF THE INVENTION

In accordance with the principles of the present invention, digital circuitry comprising multiple read-only-memory (ROM) units that store predetermined data sequences are utilized to generate a digital representation of a composite baseband signal that represents a burst of overlapping Nyquist pulses respectively derived from the bits of an input data stream. Control signals applied to the outputs of the ROMs insure that the representation accurately preserves beginning and end portions that minimize spectral spreading.

In further accord with the invention, control circuitry connected to sign inverters at the ROM outputs directly generate a digital representation of a composite quadrature-phase-modulated carrier signal that represents a burst of overlapping Nyquist pulses derived from the respective bits of two independent input data streams.

BRIEF DESCRIPTION OF THE DRAWING

A complete understanding of the present invention and of the above and other features thereof may be gained from a consideration of the following detailed description presented hereinbelow in connection with the accompanying drawing, in which.

DETAILED DESCRIPTION

Figure 1:
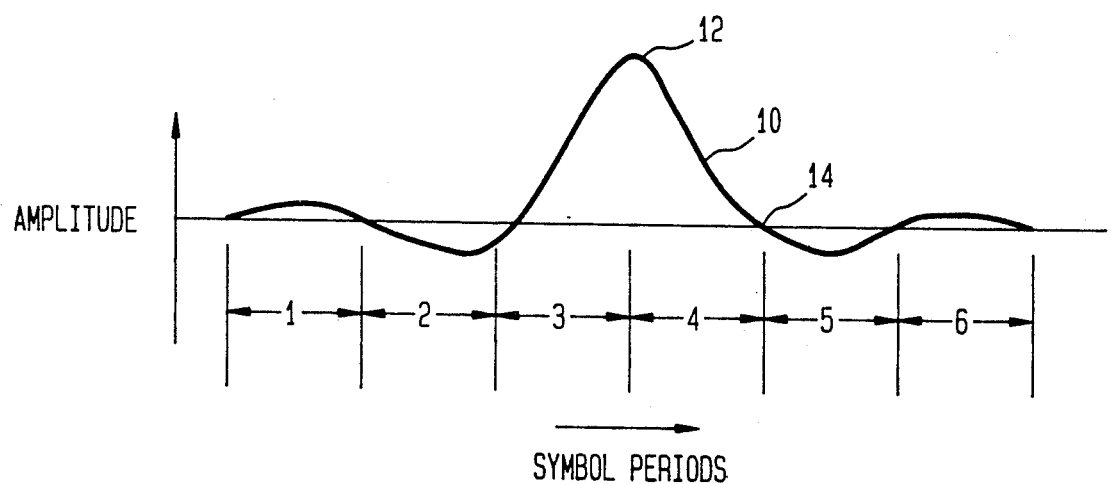
FIG. 1 is a specific illustrative representation of a Nyquist pulse of the type generated by circuits made in accordance with the present invention.

FIG. 1 shows the waveform 10 of a particular illustrative Nyquist pulse. Advantageously, pulses of this form are generated in an overlapping fashion by the circuits described hereinbelow to represent the respective individual digits of a data sequence. In such a representation, the particular depicted pulse is, for example, indicative of a binary "1" signal. In that case, the exact inverse or negative-going counterpart of the depicted pulse is considered to represent a "0" signal.

At a receiver, information is abstracted from the pulse shown in FIG. 1 by sampling the waveform 10 at its peak point 12. The next pulse in a burst sequence would overlap the depicted waveform 10. In particular, the peak point of the next pulse typically occurs at a point in time that corresponds to zero-amplitude point 14 of the waveform 10. Moreover, the next pulse has a zero-amplitude value at a point in its waveform that corresponds to the peak point 12. In that way, the overlapping pulses within a burst are ideally characterized by zero interpulse interference.

As shown in FIG. 1, the waveform 10 of the Nyquist pulse comprises six symbol periods numbered 1 through 6. The main portion of the pulse occurs in symbol periods 3 and 4. Tail portions of decreasing amplitude respectively occur in symbol periods 1,2 and 5,6 on the sides of the main portion of the pulse. These tails are designed to ensure that each pulse has a well-controlled spectral response. A burst comprising such pulses exhibits advantageous ON/OFF transitions and maintains the same well-controlled spectral response of a single pulse.

In accordance with the principles of the present invention, ROM units are utilized to store digital sequences that are representative of the portions of a Nyquist pulse in its respective symbol periods. Thus, for example, for the particular illustrative waveform 10 shown in FIG. 1, six ROM units are employed to respectively represent the waveform segments in the indicated six symbol periods.

Figure 2:
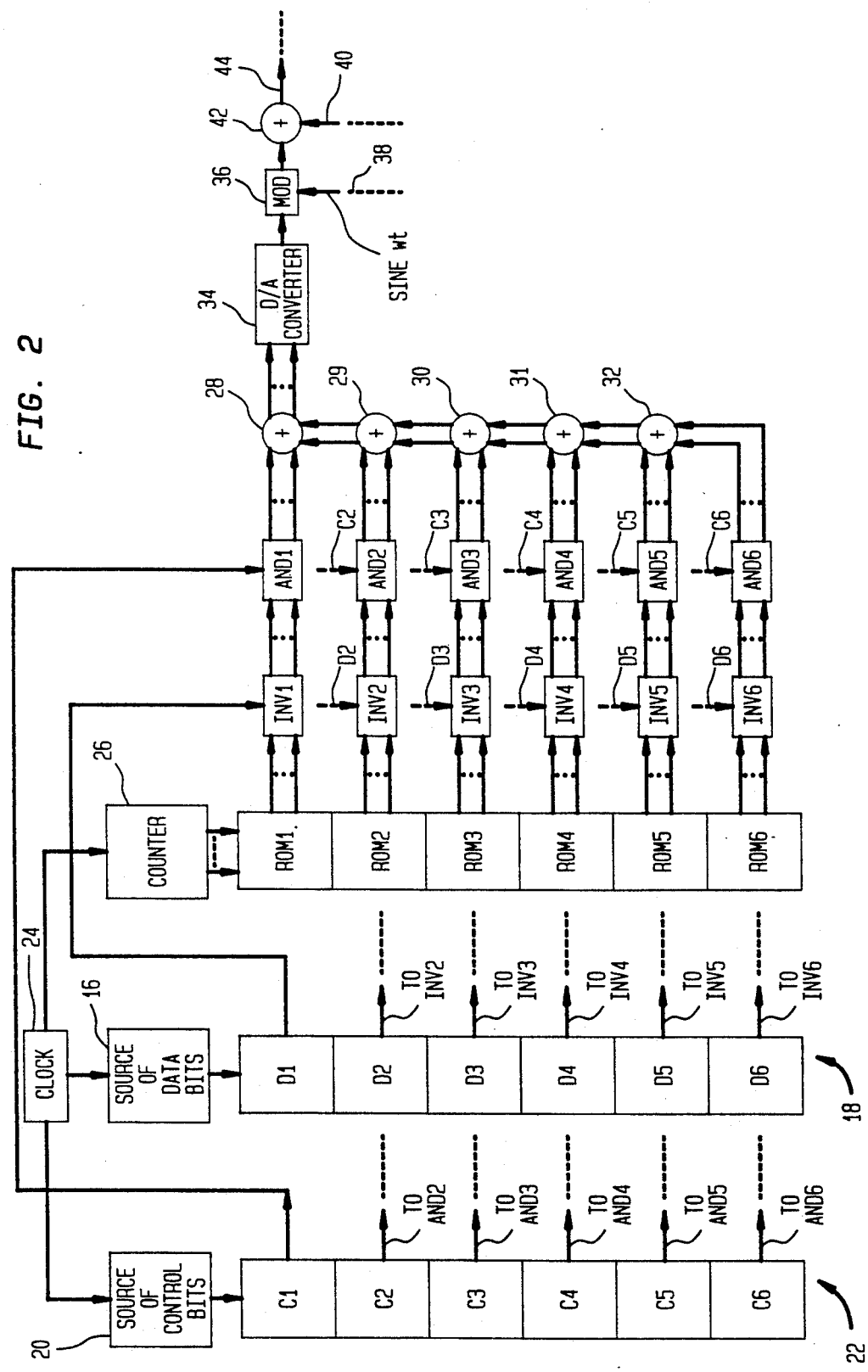
FIG. 2 show a particular illustrative circuit that is adapted to generate a digital representation of a baseband signal that represents a burst of overlapping Nyquist pulses respectively derived from the bits of an input data stream.

In FIG. 2, six ROM units designated ROM1 through ROM6 are shown. ROM1 stores predetermined bit sequences representative of the amplitude of the portion of the waveform 10 (FIG. 1) in symbol period 1. In particular, these sequences in ROM1 represent the respective amplitudes of the waveform portion in symbol period 1 at multiple (e.g. 64) equally spaced-apart points. Thus, these sequences in ROM1 constitute a quantized digital representation of the initial tail of the waveform 10 shown in FIG. 1. In a similar way, ROM2 through ROM6 are designed to store digital sequences respectively representative of the waveform portions in symbol periods 2 through 6. In each case, the contents stored in the ROMs are scaled to avoid overflow conditions.

Illustratively, ROM1 and ROM6 of FIG. 2 each respectively store 6-bit representations indicative of the amplitude of the waveform 10 at 64 points in symbol periods 1 and 6. Advantageously, ROM2 and ROM5 which store larger amplitude portions of the waveform each respectively store 64 8-bit representations. And ROM3 and ROM4 which contain quantized values indicative of the main portion (symbol periods 3 and 4) of the waveform 10 each respectively store, for example, 64 10-bit representations. Thus, ROM1 and ROM6 each include six output leads, ROM2 and ROM5 each include eight output leads, and ROM3 and ROM4 each include ten output leads.

As shown in FIG. 2, the multiple-bit output of each ROM unit is applied in parallel to a respective sign inverter. (Hereinafter all references to inverters are to sign inverters.) Thus, for example, six leads apply the output of ROM1 to its respective inverter which is designated INV1. In a similar way, the multiple-lead outputs of ROM2 through ROM6 are applied to INV2 through INV6, respectively.

In the specific illustrative circuit of FIG. 2, individual digital data bits to be converted to a burst comprising overlapping Nyquist pulses of the type described above are supplied in sequence by a source 16 to a data shift register 18. For the particular example considered herein, the register 18 comprises six interconnected stages designated D1 through D6.

In synchronism with the application of data bits to the shift register 18 of FIG. 2, individual control bits are supplied in sequence by a source 10 to a control shift register 22. These control bits indicate if the associated data bits are to be transmitted. The register 22 includes six interconnected stages designated C1 through C6.

Operation of the sources 16 and 20 of FIG. 2 is controlled by a clock 24. Additionally, the clock 24 controls the operation of a counter 26 whose output is connected to each of the units designated ROM1 through ROM6. Illustratively, the counter is designed to repeatedly generate a 64-count cycle. Thus, the counter 16 includes six parallel output leads connected to ROM1 through ROM6 for applying a sequence of 64 six-bit numbers to each of those units. Each such number constitutes the address of one of the 64 predetermined quantized values stored in each of the ROMs. Illustratively, the sequential application of these addresses to the ROMs is controlled to occur at a rate that is 64 times that at which data and control bits are shifted through the registers 18 and 20. The data and control bits shift when the address counter transitions from a count of 63 to a count of 0.

The inverters connected to the outputs of the ROM units are controlled to invert or not invert the respective ROM outputs depending on the values of data bits stored in the shift register 18. Thus, for example, assume that a positive Nyquist pulse is to be representative of a "1" data bit and that a negative such pulse is to be representative of a "0" data bit. Assume further that the individual sequences stored in each ROM are respectively representative of a positive Nyquist pulse. In that case, for a "1" data bit stored in D1, INV1 will in effect be controlled thereby not to invert the quantized output representations supplied by ROM1. As a result, 64 consecutive quantized values provided by ROM1 will be passed by INV1 in unmodified form to an associated AND circuit designated AND1. In turn, whether or not those values are passed by AND1 to an associated summing circuit 28 is determined by the value of the control bit stored in C1. If C1 has the value "1", the values are so passed by AND1. If C1 is "0", the values are not passed to the circuit 289.

By supplying a predetermined sequence of control bits to the register 22 of FIG. 2, it is possible to generate specified tails at the beginning and end of a burst of overlapping individual Nyquist pulses. This predetermined sequence contains a "1" value for each Nyquist pulse representing a data value of "0" or "1" to be transmitted. Thus, for example, at the beginning of a burst, the register 22 is arranged to store a "1" in C1 and a "0" in each of the stages designated C2 through C6. In that way, only AND1 is enabled and the tail representation stored in ROM1 is passed to the summing circuit 28. The other representations provided by ROM2 through ROM6 and inverted or not by INV2 through INV6, depending on which prior values happen to be stored in D2 through D6 at the beginning of a burst, are in effect blocked from appearing at the outputs of AND2 through AND6 by "0" signals respectively applied thereto from C2 through C6. By so blocking these other representations, a digital representation of an exactly specified tail such as the one shown in symbol period 1 of FIG. 1 is supplied to the summing circuit 28.

As data and control bits cycle through the registers 18 and 22, subsequent portions of the first pulse of a burst, as well as portions of subsequent overlapping pulses, are represented by outputs from ROM1 through ROM6. These outputs are applied to the aforenoted inverters and AND circuits and then to a summing network that comprises the summing circuit 28 and additional summing circuits 29 through 32.

The FIG. 2 circuit is based on linear modulation. The output provided by the circuit at each point in time is the linear sum of individual overlapping pulses. In particular, the composite summed signal provided at the output of the summing circuit 28 is a digital representation of a baseband signal that represents overlapping Nyquist pulses respectively derived from the bits of an input data stream provided by the source 16. And, as described earlier above, by selectively providing control bits from the register 22, it is possible in effect to preserve the beginning and end portions of the composite signal to exhibit prespecified tail characteristics.

The composite baseband digital representation provided at the output of the summing circuit 28 of FIG. 2 is applied to a conventional digital-to-analog converter 34. If desired, the baseband analog signal at the output of the converter 34 can then be transmitted directly on a suitable transmission medium such as a wire line. Alternatively, this analog signal can be used to modulate a carrier in known ways to provide a modulated carrier for transmission on a variety of wire-type or wire-less media such as, for example, a radio channel in a TDMA system.

By way of a specific illustrative example, the output of the converter 34 of FIG. 2 is shown applied to a standard modulator 36 where a sine ωt carrier on line 38 is combined with the aforedescribed analog representation to generate a modulated carrier. If desired, a modulated carrier provided by a cosine ωt carrier modulated with an analog representation of another stream of data bits can be combined with the signal appearing at the output of the modulator 36. As indicated in FIG. 2, a signal representative of such another stream of data bits appears on line 40 and is combined with the output of the modulator 36 in summing circuit 42. Advantageously, the signal appearing on the line 40 is derived from a composite baseband representation generated by a digital circuit identical to the one shown in FIG. 2. In such an arrangement, the final output signal appearing on line 44 of FIG. 2 constitutes a quadrature-phase-modulated ωt carrier having embodied therein information relative to two independent data streams.

Figure 3:
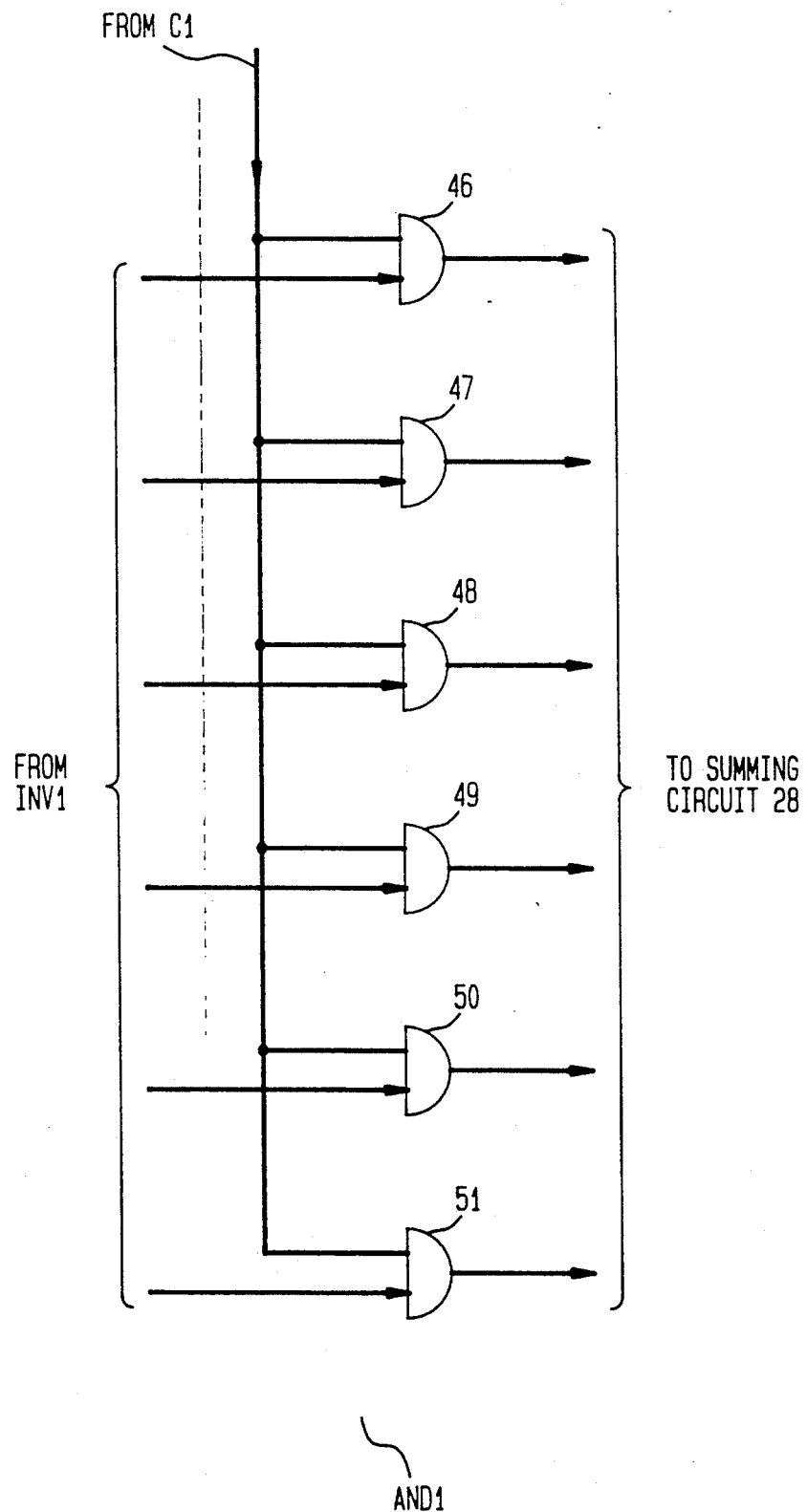
FIG. 3 is a more detailed showing of one of the AND circuits included in FIG. 2.

FIG. 3 is a more detailed showing of one of the identical AND circuits represented in FIG. 2. In particular, FIG. 3 shows the details of AND1. As indicated, AND1 comprises six individual AND gates 46 through 51. One of the inputs to each of these AND bits is the representation stored in C1 of the control shift register 22. When this representation is a "1" signal, C1 functions to allow the six-bit output of INV1 to be applied to the summing circuit 28. When C1 is a "0", the output of INV1 is blocked from being applied to the summing circuit 28, as described earlier above.

Figure 4:
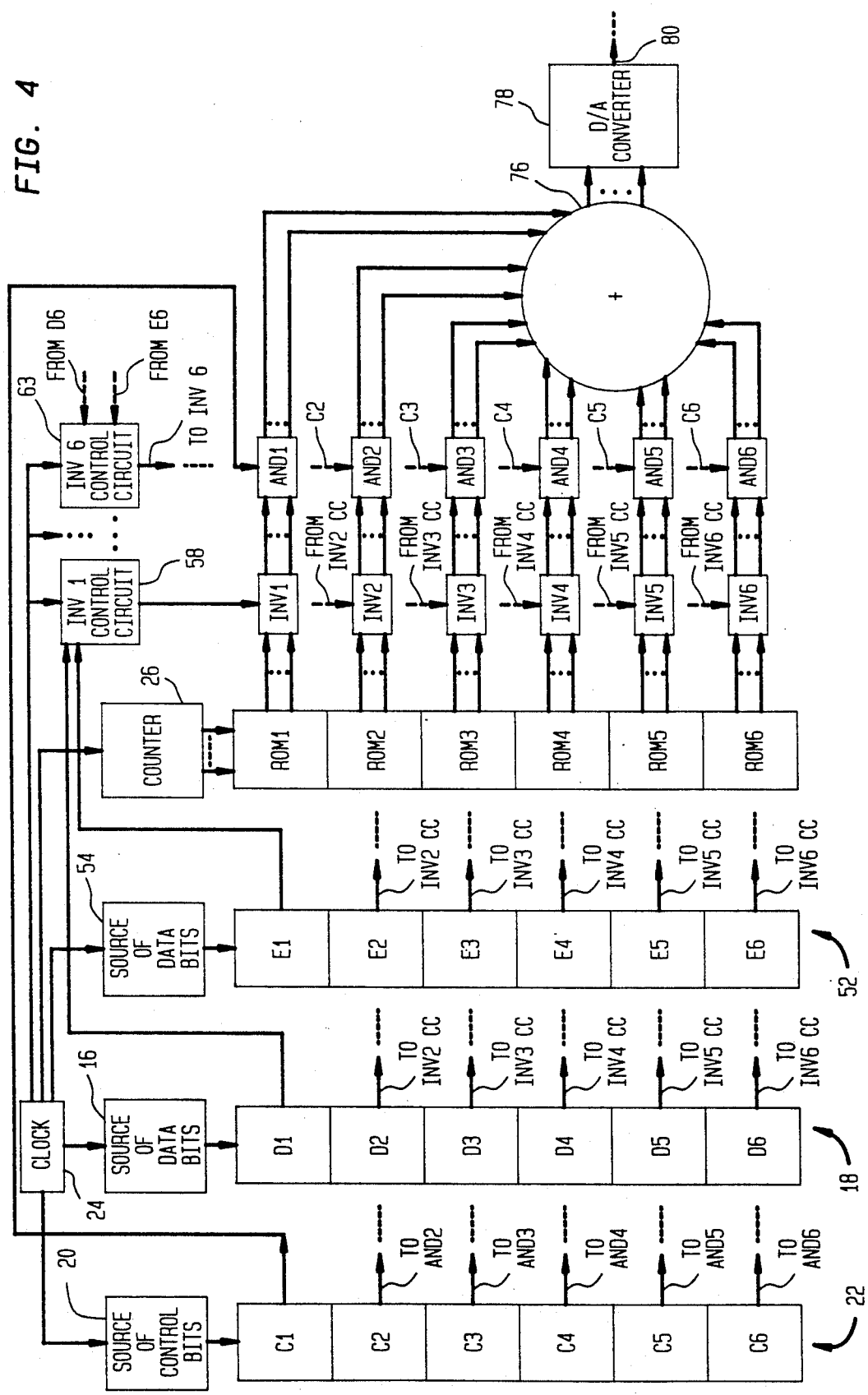
FIG. 4 depicts a specific illustrative circuit that is adapted to generate a digital representation of a quadrature-phase-modulated carrier signal that represents a burst of overlapping Nyquist pulses derived from the respective bits of two independent input data streams.

FIG. 4, which is an advantageous variant of the circuit shown in FIG. 2, is designed to provide a digital representation of a quadrature-phase-modulated carrier signal. Illustratively, certain portions of the FIG. 4 circuit are identical to corresponding portions of FIG. 2. In FIG. 4, these portions are designated with the same reference numerals utilized therefor in FIG. 2. These corresponding portions include the clock 24, a source 20 of control bits, a source 16 of data bits, a control shift register 22, a data shift register 18, a counter 26, ROM1 through ROM6, INV1 through INV6 and AND1 through AND6.

Further, FIG. 4 includes a second data shift register 52 and a second source 54 of data bits. The bits supplied by the sources 16 and 54 are independent of each other but are respectively applied to the registers 18 and 52 in synchronism in response to signals applied thereto from the clock 24. As in the FIG. 2 circuit, the rate at which control and data bits are shifted into the registers 18, 22 and 52 is designed to be one sixty-fourth of the rate at which the counter 26 cycles through the 64 digital representations stored in each of the ROM units. In one particular illustrative embodiment of FIG. 4, the clock rate is designed to be 16 MegaHertz. In that case, the frequency of the modulated carrier that is directly provided by the digital circuitry of FIG. 4 is 4 MegaHertz.

In FIG. 4, each of the inverters designated INV1 through INV6 is connected to a respective inverter control circuit. Thus, for example, as explicitly shown in FIG. 4, control circuit 58 is connected to INV1 and control circuit 63 is connected to INV6.

The control circuits 58 . . . 63 respectively connected to INV1 through INV6 are identical to each other. Signals from the clock 24 and from the registers 18 and 52 are applied to the inverter control circuits as inputs thereto. Thus, for example; signals from the clock 24 and signals representative of data bits D1 and E1 constitute the inputs to the control circuit 58, and signals from the clock 24 and signals representative of data bits D6 and E6 constitute the inputs to the control circuit 63. Clock signals and signals representative of the bit pairs $D_2$-$E_2$, $D_3$-$E_3$, $D_4$-$E_4$ and $D_5$-$E_5$ are respectively applied to the other four control circuits connected to INV2 through INV5, respectively.

Each of the inverter control circuits 58 . . . 63 of FIG. 4 is designed to generate a predetermined four-bit sequence in response to the clock and data signals applied thereto. The individual bits of these sequences occur at the same rate at which ROM1 through ROM6 are being addressed by the counter 26. In that way, one bit of each sequence provided by the inverter control circuits is applied to its respective inverter in synchronism with the readout of the ROM units. Hence, each such control bit determines in effect whether the multi-bit quantized representation read out of a ROM unit at a particular sampling point is to be inverted or not by its respective inverter.

Figure 5:
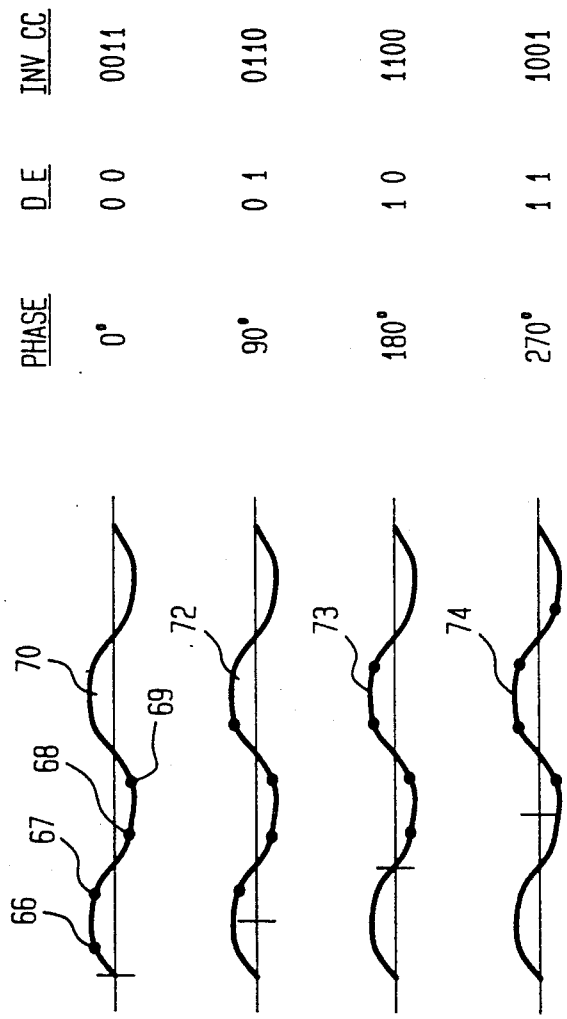
FIG. 5 is a simplified schematic that indicates the manner in which the phase of the modulated carrier generated by the FIG. 4 circuit is determined by bit sequences provided by inverter control circuitry.

FIG. 5 shows one specific illustrative set of four-bit sequences generated by the inverter control circuits 58 . . . 63 in response to clock and data signals applied thereto. As indicated in the top row of FIG. 5, if the data bits D and E stored in corresponding stages of the shift registers 18 and 52 each have the value "0", the inverter control circuit connected to those stages is designed to generate an inverter control circuit sequence (INV CC) consisting of 0011. Further, as shown in subsequent rows of FIG. 5, if D and E have the values "0" and "1", respectively, INV CC has the value 0110; if D and E have the values "1" and "0", respectively, INV CC is 1100; and if D and E are each "1", INV CC is designed to be 1001.

As indicated in FIG. 5, each different pair of D and E values is represented by a respectively different four-bit INV CC sequence. This representational mode provides a basis for uniquely controlling each multi-bit output of the ROM units to embody information relative to two independent binary data bits. In particular, as described below and as shown in FIG. 5, the bits provided by the ROM units are in effect thereby encoded in a digital representation that comprises a quadrature-phase-modulated carrier.

For purposes of a specific illustrative example, assume that in respective response to the first four counts applied thereto from the counter 26, ROM1 provides at its output four six-bit representations each indicative of a quantized negative value of a portion of a specified pulse waveform. For simplicity, assume further that these values are all equal to each other. Also, assume that D1 and E1 each have the value "0". In that case, the bits "0", "0", "1" and "1" of the INV CC sequence 0011 will be applied to INV1 in respective synchronism with the first four sequentially occurring six-bit representations from ROM1. The INV CC sequence 0011 then repeats in synchronism with each subsequent set of four representations from ROM1.

As a result, the first representation from ROM1 will be inverted by INV1 to apply a positive value to AND1, the second representation from ROM1 will also be inverted by INV1 to apply a positive value to AND1, the third representation from ROM1 will not be inverted by INV1 before being applied to AND1, and the fourth representation from ROM1 also will not be inverted by INV1 before being applied to AND1. As in the FIG. 2 circuit, and for the same reason described in connection therewith, each representation applied to an AND circuit is passed or not therethrough depending on whether or not an enabling control signal is applied thereto.

The resulting four representations applied to AND1 of FIG. 4 in response to INV CC 0011 are schematically indicated in the left-hand part of the top row of FIG. 5 where their values are designated 66 through 69, respectively. In correspondence with the description above, the values indicated by points 66 and 67 are positive, while the values indicated by points 68 and 69 are negative. A constructed sine wave 70 at one-fourth the sampling frequency is uniquely determined by the four quantized points 66 through 69 is shown in FIG. 5. The phase angle of the sine wave 70 is designated as zero degrees (0°).

In an exactly similar way, it can easily be shown that constructed sine waves 72 through 74 result from the respective data and INV CC values shown in the second, third and fourth rows of FIG. 5. These additional sine waves 72 through 74 exhibit phase angles of 90°, 180° and 270° relative to the top-most sine wave 70. Thus, it is apparent that the digital circuit described herein provides a basis for conventional quadrature-phase modulation.

As indicated in FIG. 5, each different pair of data bit values determines the phase of a digital representation of a sine wave derived from the quantized values stored in a ROM unit. In particular, the indication provided at the output of each inverter connected to a ROM unit is a digital representation of a portion of a quadrature-phase-modulated carrier. The frequency of the carrier thus modulated is one-fourth the counting rate of the counter 26.

As in the FIG. 2 circuit, the individual representations provided by AND1 through AND6 of FIG. 4 are then combined to form a composite digital representation of a complete sequence of overlapping pulses. In FIG. 4, such combining is carried out by generically represented summing circuit 76 which may, for example, be structured in the particular illustrative way shown in FIG. 2 (specifically, see summing circuits 28 through 32 in FIG. 2).

Significantly, unlike the FIG. 2 circuit where a digital representation of a baseband signal indicative of a single sequence of data bits is provided at the output of the summing circuit 28, the FIG. 4 circuit provides at the output of the summing circuit 76 a digital representation of two independent sequences of data bits in the form of a quadrature-phase-modulated carrier. After passing through a conventional digital-to-analog converter 78 shown in FIG. 4, the indicated representation is available on line 80 as a quadrature-phase-modulated carrier signal ready for transmission in, for example, a TDMA radio system.

The circuits described herein and shown in FIGS. 2 and 4 are completely digital in nature and are characterized by relatively low complexity. As such, they are advantageous in that they are well suited for implementation in reliable low-cost very-large-scale-integrated (VLSI) form.

Finally, it is to be understood that the above-described specific arrangements are only illustrative of the application of the principles of the present invention. In accordance with these principles, numerous modifications and alternatives may be devised by those skilled in the art without departing from the spirit and scope of the invention. Thus, for example, these principles can be easily extended to perform what is commonly known as pi/4 quadrature-phase-shift-key (QPSK) modulation.

What is claimed is:

1. A digital circuit for converting data bits into a digital representation of a burst of overlapping signaling pulses having prespecified tail characteristics, said circuit comprising:
   multiple ROM units each respectively adapted to store multiple predetermined binary representations each indicative of a quantized value of a portion of a signaling pulse,
   means including multiple sign inverters respectively connected to the outputs of said ROM units and respectively responsive to the data bits for providing a representation of each such quantized value or a representation of the inverse of each such quantized value with its sign inverted,
   means for summing the outputs of said sign inverters,
   and means controlling which outputs of said sign inverters are permitted to pass to said means for summing.

2. A circuit as in claim 1 further comprising:
   a data shift register comprising multiple stages for respectively storing data bits,
   a control shift register comprising multiple stages for respectively storing control bits,
   and means for shifting bits in synchronism through the stages of said data shift register and through the stages of said control shift register.

3. A circuit as in claim 2 wherein each of said data shift register and said control shift register comprises the same number of register stages, and the number of ROM units equals the number of stages in each register, each of said ROM units being associated with respective stages of said data shift register and said control shift register.

4. A circuit as in claim 3 wherein the sign inverter connected to the output of each different ROM unit is controlled by the data bit stored in the data shift register stage associated with the ROM unit.

5. A circuit as in claim 4 wherein an AND circuit is connected between said means for summing and the output of each different sign inverter.

6. A circuit as in claim 5 wherein the AND circuit connected to the output of each different inverter is controlled by the control bit stored in the control shift register stage associated with the ROM unit connected to said inverter.

7. A circuit as in claim 6 wherein the output of said summing circuit comprises a digital representation of a baseband signal comprising a burst of overlapping signaling pulses having prespecified tail characteristics, said baseband signal being representative of a sequence of data bits, and wherein said circuit further comprises a digital-to-analog converter connected to the output of said summing circuit.

8. A circuit as in claim 1 further comprising:
   a first data shift register comprising multiple stages for respectively storing data bits,
   a second data shift register comprising multiple stages for respectively storing data bits,
   a control shift register comprising multiple stages for respectively storing control bits,
   and means for shifting bits in synchronism through the stages of said first data shift register, through the stages of said second data shift register and through the stages of said control shift register.

9. A circuit as in claim 8 wherein each of said first data shift register, said second data shift register and said control shift register comprises the same number of register stages, and the number of ROM units equals the number of stages in each register, each of said ROM units being associated with respective stages of said first data shift register, said second data shift register and said control shift register.

10. A circuit as in claim 9 further including a clock for timing the shifting of bits through said registers.

11. A circuit as in claim 10 further including a counter responsive to said clock for repetitively addressing the representations stored in said ROM units at a specified rate, said rate being fast relative to the rate at which bits are shifted through said registers.

12. A circuit as in claim 11 wherein the inverter connected to the output of each different ROM unit is controlled by a respective inverter control circuit that is responsive to signals provided by said clock and to the pair of data bits stored in the first and second data shift register stages associated with the ROM unit to generate a four-bit inverter control sequence that is uniquely indicative of said data bit pair, the bits of said inverter control sequence being applied from an inverter control circuit to its respective inverter in synchronism with the application to said inverter of successive quantized representations from its respective ROM unit.

13. A circuit as in claim 12 wherein an AND circuit is connected between said means for summing and the output of each different inverter.

14. A circuit as in claim 13 wherein the AND circuit connected to the output of each different inverter is controlled by the control bit stored in the control shift register stage associated with the ROM unit connected to said inverter.

15. A circuit as in claim 14 wherein the output of said summing circuit comprises a digital representation of a quadrature-phase-modulated carrier signal comprising a burst of overlapping signaling pulses having prespecified tail characteristics, said carrier signal being representative of two sequences of data bits, and wherein said circuit further comprises a digital-to-analog converter connected to the output of said summing circuit.

* * * * *